US007418594B2

(12) United States Patent
Tanaka et al.

(10) Patent No.: US 7,418,594 B2
(45) Date of Patent: Aug. 26, 2008

(54) MOBILE UNIT AUTHENTICATING METHOD

(75) Inventors: Hiroshi Tanaka, Asaka (JP); Izumi Miyake, Asaka (JP)

(73) Assignee: Fujifilm Corporation, Tokyo (JP)

( * ) Notice: Subject to any disclaimer, the term of this patent is extended or adjusted under 35 U.S.C. 154(b) by 748 days.

(21) Appl. No.: 10/061,394

(22) Filed: Feb. 4, 2002

(65) Prior Publication Data

US 2002/0108038 A1 Aug. 8, 2002

(30) Foreign Application Priority Data

Feb. 5, 2001 (JP) .............................. 2001-028065

(51) Int. Cl.
*H04L 9/32* (2006.01)
*H04K 1/00* (2006.01)
*G06Q 30/00* (2006.01)
*H04M 11/00* (2006.01)

(52) U.S. Cl. ........................... 713/168; 726/4; 380/247; 705/26; 455/406; 455/411; 455/414.1

(58) Field of Classification Search ................. 380/247; 713/168, 169; 726/4, 5, 9; 455/406, 420, 455/410, 411, 414.1; 705/77, 52, 53, 26
See application file for complete search history.

(56) References Cited

U.S. PATENT DOCUMENTS

| 6,430,407 | B1 * | 8/2002 | Turtiainen ................... 455/411 |
| 6,480,673 | B2 * | 11/2002 | Liebenow ....................... 396/2 |
| 6,631,271 | B1 * | 10/2003 | Logan ...................... 455/456.1 |
| 6,766,160 | B1 * | 7/2004 | Lemilainen et al. ......... 455/411 |
| 6,772,331 | B1 * | 8/2004 | Hind et al. ................... 713/151 |
| 6,938,066 | B1 * | 8/2005 | Doi ............................ 709/202 |
| 7,058,414 | B1 * | 6/2006 | Rofheart et al. .......... 455/456.4 |

FOREIGN PATENT DOCUMENTS

| JP | 2000-187763 | 7/2000 |
| WO | WO 0058920 A1 * | 10/2000 |

\* cited by examiner

*Primary Examiner*—Emmanuel L Moise
*Assistant Examiner*—Zachary A Davis
(74) *Attorney, Agent, or Firm*—Birch, Stewart, Kolasch & Birch, LLP

(57) ABSTRACT

Before obtaining service from an installed terminal, a mobile unit can be authenticated (subauthenticated) only by the operation of the mobile unit such as an unauthenticated digital camera, etc. using an authenticated mobile phone. A digital camera is radio-connected with an installed terminal, and the digital camera is also radio-connected with a mobile phone of a user. The installed terminal center is notified of the identification code of the mobile phone through the digital camera and the installed terminal. The installed terminal center inquires of the carrier center about the validity/invalidity of the mobile phone. Upon receipt of the notification of the validity of the mobile phone from the carrier center, the installed terminal center permits service to the installed terminal in the installed terminal.

16 Claims, 7 Drawing Sheets

FIG.4

```
JOB{
Type = Standard
Quantity = 2
File="..¥IMAGE¥001VACATION¥DSCF0002.JPG"
}

JOB{
Type = Standard
Quantity = 1
File="..¥IMAGE¥001VACATION¥DSCF0004.JPG"
}

JOB{
Type = Standard
Quantity = 3
File="..¥IMAGE¥001VACATION¥DSCF0005.JPG"
}

JOB{
Type = Standard
Quantity = 2
File="..¥IMAGE¥002BIRTHDAY¥DSCF0002.JPG"
}
```

IMAGE FILE IS SPECIFIED IN PATH

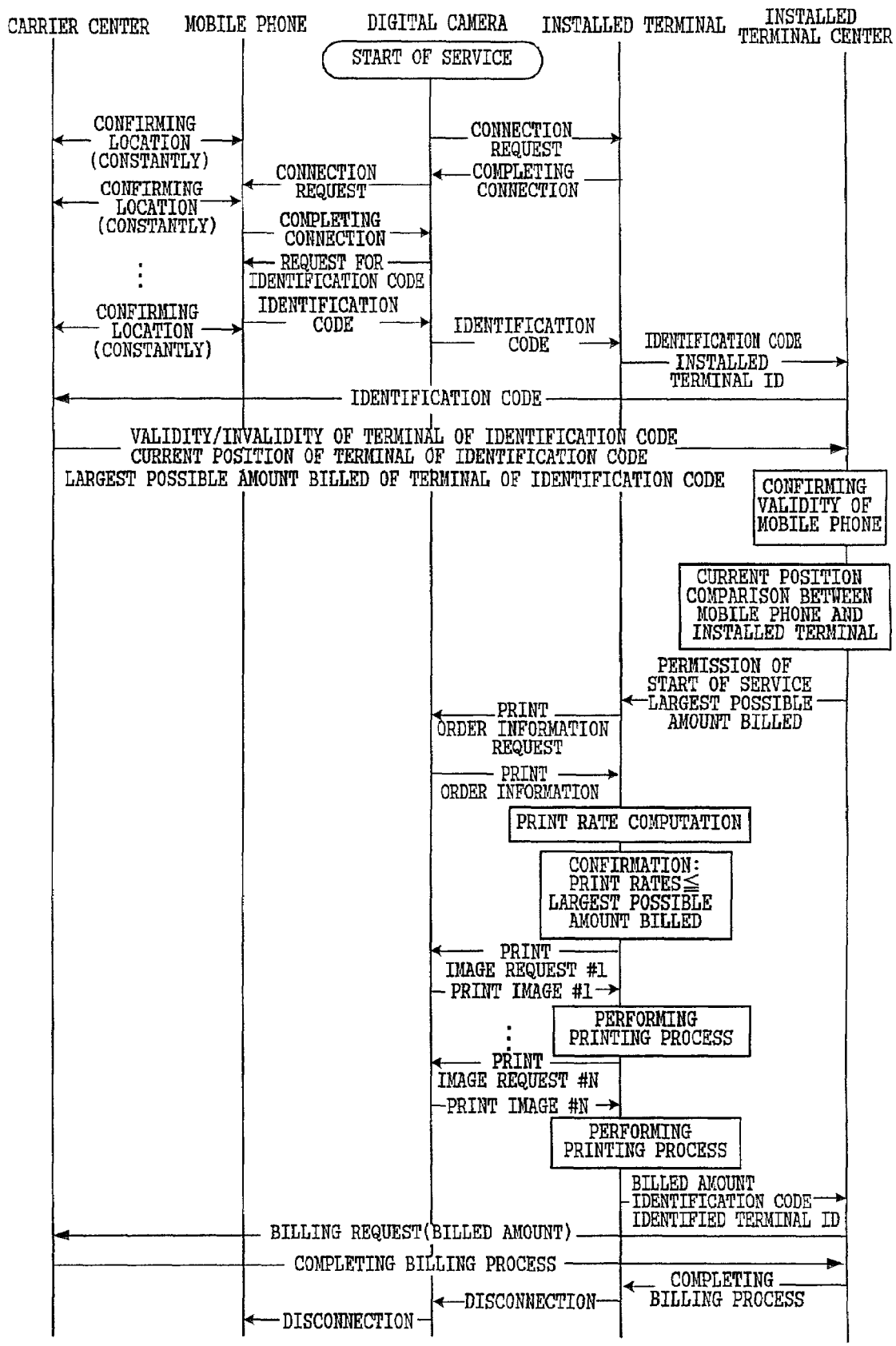

MOBILE UNIT AUTHENTICATING METHOD

BACKGROUND OF THE INVENTION

1. Field of the Invention

The present invention relates to a mobile unit authenticating method, and more specifically to mobile unit authenticating method for authenticating a mobile unit of a user when offering service by receiving or transmitting digital contents between, for example, an installed terminal in a store and a user mobile unit.

2. Description of the Related Art

Japanese Patent Application Publication No. 2000-187763 discloses a cashless vending machine system in which a user can purchase articles by using a charging system authenticated by a carrier. In this vending machine system, when a user inputs his or her password for personal identification on his or her mobile phone, the common carrier can authenticate the user (contractor of the mobile phone) using the password. Then, when the user inputs an identification code of the vending machine on the mobile phone, the common carrier allows the user to purchase the specified article on the vending machine through the identification code of the vending machine. If the user selects an article using an article button, the selected article is served to the user, and the purchase record of the article is transmitted from the vending machine to the common carrier. The common carrier then charges the user the purchase price for the article purchased through the vending machine when the telephone rates are charged.

However, when the conventional billing system of the mobile phone is used, and when cashless printing service, music downloading service, etc. are offered to a mobile unit other than a mobile phone such as a digital camera, a solid state portable stereo (MP3 unit, etc.), etc. from an installed terminal, there is the above mentioned problem that a mobile unit has to be operated with the mobile phone, thereby necessarily performing a complicated operation.

SUMMARY OF THE INVENTION

The present invention has been developed to solve the above-mentioned problem, and aims at providing a mobile unit authenticating method capable of obtaining service by authenticating (subauthenticating) a mobile unit other than an authenticated mobile phone, etc. only by operating the unauthenticated mobile unit before obtaining the service from an installed terminal.

To attain the above mentioned object, the present invention is directed to a mobile unit authenticating method which authenticates a first mobile unit of a user when service is offered through communications between an installed terminal and the first mobile unit, comprising the steps of: connecting the first mobile unit to the installed terminal, connecting the first mobile unit to a second mobile unit of the user which has been authenticated by another system, and transmitting identification information about the second mobile unit to the installed terminal through the first mobile unit; transmitting the identification information about the second mobile unit from the installed terminal or an installed terminal center which integrally manages a plurality of installed terminals including the installed terminal to a management center which manages the identification information about the second mobile unit when the installed terminal receives the identification information about the second mobile unit; determining validity/invalidity of the second mobile unit according to the received identification information about the second mobile unit when the management center receives the identification information about the second mobile unit, and transmitting a determination result to the installed terminal or the installed terminal center; and setting service of the installed terminal as allowed/rejected in the installed terminal based on the determination result whether the second mobile unit is valid or invalid.

According to the present invention, a user of an installed terminal is provided with a first mobile unit such as a digital camera, etc. which obtains service, and a second mobile unit such as a mobile phone, etc. which has been authenticated. The first mobile unit fetches the identification information about the second mobile unit through the communications with the second mobile unit when the first mobile unit obtains service from the installed terminal, and transmits the identification information to the installed terminal. The installed terminal transmits the identification information about the second mobile unit to a management center directly or through an installed terminal center. The management center determines whether the second mobile unit is valid or invalid according to the received identification information about the second mobile unit, and transmits the determination result to the installed terminal or the installed terminal center. If the management center receives the determination result that the second mobile unit is valid (authentication of the second mobile unit), it authenticates the first mobile unit which communicates with the second mobile unit (subauthentication), and allows service in the installed terminal. The subauthentication can be unconsciously completed by automatically connecting the first mobile unit to the second mobile unit through a radio interface such as Bluetooth, etc.

The present invention is also directed to a mobile unit authenticating method which authenticates a first mobile unit of a user when service is offered through communications between an installed terminal and the first mobile unit, comprising the steps of: connecting the first mobile unit to the installed terminal, connecting the first mobile unit to a second mobile unit of the user which has been authenticated by another system, obtaining identification information about the installed terminal, and transmitting the identification information about the installed terminal and the identification information about the second mobile unit to a management center for managing the identification information about the second mobile unit; determining validity/invalidity of the second mobile unit according to the received identification information about the second mobile unit when the management center receives the identification information about the second mobile unit, and transmitting a determination result to the installed terminal or the installed terminal center for integrally managing a plurality of installed terminals including the installed terminal; and setting service of the installed terminal as allowed/rejected in the installed terminal based on the determination result whether the second mobile unit is valid or invalid.

That is, according to an embodiment of the present invention, an installed terminal receives the identification information about a second mobile unit, and transmits the information to a management center directly or through an installed terminal center. On the other hand, according to another embodiment of the present invention, the second mobile unit fetches the identification information about an installed terminal, and transmits the identification information about the second mobile unit together with the identification information about the installed terminal to a management center. The management center determines whether the second mobile unit is valid/invalid according to the transmitted identification information about the second mobile unit, and transmits the determination result to the installed terminal directly or through the installed terminal center according to the identification information about the installed terminal. Upon receipt of the determination result that the second mobile unit is valid, the installed terminal permits the service.

Preferably, the management center transmits information about a current position of the second mobile unit, the installed terminal or the installed terminal center compares a position of the installed terminal with the current position of the second mobile unit, and allows/rejects service in the installed terminal based on a comparison result. That is, when the current position of the second mobile unit matches the installation position of the installed terminal, the second mobile unit can be recognized as the unit owned by the user of the first mobile unit, thereby more correctly authenticating the first mobile unit.

Preferably, the management center manages billing information about the user of the second mobile unit, and transmits information about a largest possible amount billed of the second mobile unit while the installed terminal or the installed terminal center allows service in the installed terminal when the billed amount of the user for the service in the installed terminal is equal to or smaller than the largest possible amount billed.

Preferably, the installed terminal or the installed terminal center charges the management center for service rates on offered service in the installed terminal, and the management center includes the service rates in the billed amount of the user of the second mobile unit. Thus, the user can obtain cashless service from the installed terminal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 shows the contents of the print order file;

FIG. 7 is an explanatory flowchart of the operations of the system including the mobile unit authenticating method according to the present invention.

DETAILED DESCRIPTION OF THE PREFERRED EMBODIMENTS

The preferred embodiments of the mobile unit authenticating method according to the present invention are described below by referring to the attached drawings.

Figure 1:
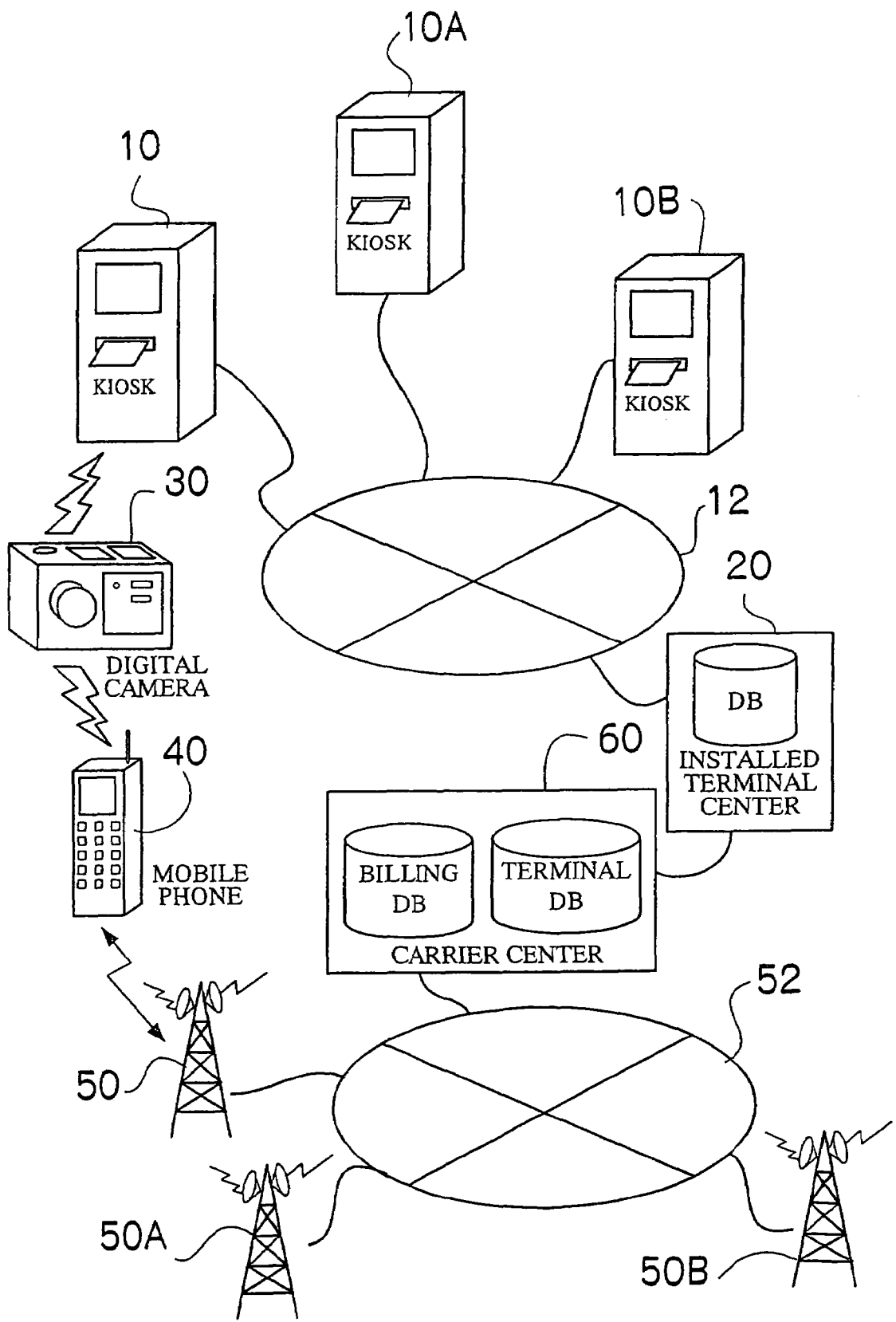
FIG. 1 shows the configuration of the system to which the mobile unit authenticating method according to the present invention is applied.

FIG. 1 shows the configuration of the system to which the mobile unit authenticating method of the present invention is applied.

As shown in FIG. 1, the system comprises a plurality of installed terminals 10, 10A, 10B, . . . installed in shops, etc., an installed terminal center 20 connected to the installed terminals 10, 10A, 10B, . . . through an exclusive network 12, a user digital camera 30 (first mobile unit) and a mobile phone 40 (second mobile unit), a plurality of base stations 50, 50A, 50B, . . . for radio-communicating with a mobile phone, and a carrier center 60 (management center) connected to the plurality of base stations 50, 50A, 50B, . . . through a telephone line network 52. The installed terminal center 20 is connected to the carrier center 60 through a communications line.

After the authentication of the digital camera 30, the installed terminal 10 offers print service based on the image data received from the digital camera 30. The digital camera 30 is authenticated using the mobile phone 40 of a user authenticated in the carrier center 60. The details of this process are described later.

The installed terminal center 20 centrally manages the plurality of installed terminals 10, 10A, 10B, . . . , determines the permission/rejection of the service in an installed terminal, issues a bill for print rates to the carrier center 60, etc. The installed terminal center 20 manages the positional information about each installed terminal, identification data, etc. as a database.

The digital camera 30 is a mobile unit other than the mobile phone 40 of a user, and is used for print service in the installed terminal 10. The digital camera 30 can be connected to the installed terminal 10, and the digital camera 30 can be connected to the mobile phone 40 through a low-power short-distance radio communications such as Bluetooth, etc. The digital camera 30 and the mobile phone 40 are paired with each other so that they can communicate with each other as necessary.

The carrier center 60 manages the identification code (including a telephone number) and the user personal information about each mobile phone, billing information, etc. as a database. The carrier center 60 can detect the location of each mobile phone depending on which base station each mobile phone can communicate with.

Figure 2:
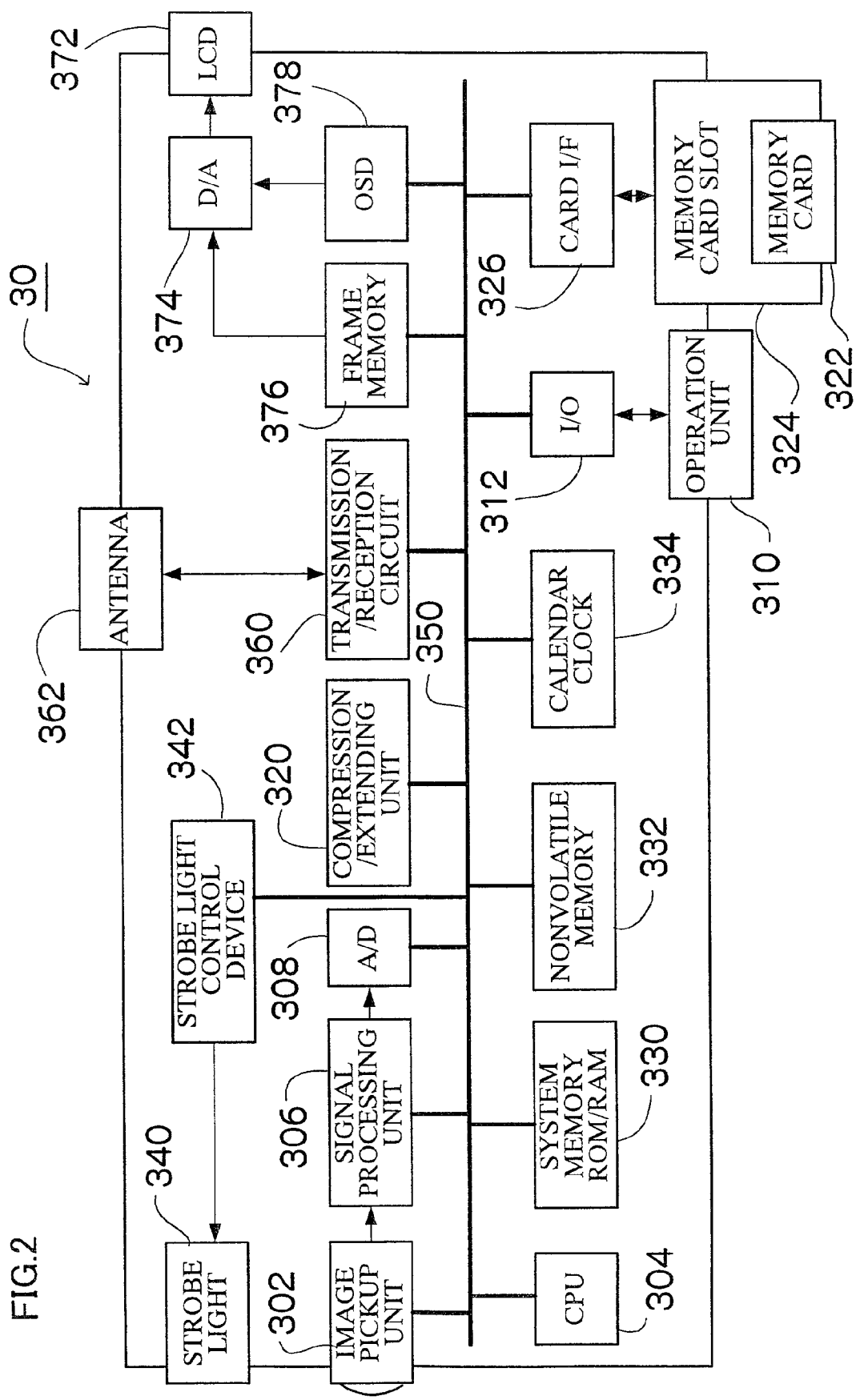
FIG. 2 is a block diagram of the internal configuration of a digital camera shown in FIG. 1.

FIG. 2 is a block diagram of the internal configuration of the digital camera 30. As shown in FIG. 2, an image pickup system of the digital camera 30 comprises an image pickup unit 302 for forming an image of a subject on a photoreceptive surface for photoelectric conversion and outputting image data, a central processing unit (CPU) 304 for controlling the entire digital camera 30, and controlling the sampling timing of image data, the record of image data, communications, display, the generation of image sort directory, etc., a signal processing unit 306 for amending white balance, gamma, etc., and an A/D converter 308 for converting an analog image signal into digital image data.

Furthermore, the input system of the digital camera 30 comprises an operation unit 310 including a shutter button, a mode switch dial, a menu key, multifunction cross key, etc., and an I/O 312 which is a port for converting each information signal input by the operation unit 310.

An image conversion system of the digital camera 30 comprises a compression extending unit 320 for controlling the compression of the information about image data and voice data in the method represented by the JPEG and MPEG, and a card interface 326 for converting data to store image data in and read it from a memory card 322 through a card slot 324.

The CPU 304 is connected through a bus 350 to the ROM storing an operation program and each constant, memory 330 which is a work area when a program is executed and is configured by the RAM which is a storage device capable of storing images and voice, nonvolatile memory 332 which is a storage device capable of continuously storing various constants relating to the operations of the digital camera 30 even during power shutdown, a calendar/clock 334 for management of a photo shooting date, etc., and a strobe light control device 342 for controlling the flash of strobe light 340 to complement the light quantity of the subject when a photo is taken.

The communications device of the digital camera 30 used when image data, etc. is transmitted to and received from an external unit through communications comprises a transmission/reception circuit 360 for transmitting and receiving information such as image data, voice data, directory information, etc. at a command from the CPU 304, and an antenna 362 for transmitting and receiving a carrier and data. According to the embodiment, radio communications with Bluetooth for communications with short distance and low power are used.

The display system of the digital camera 30 is provided with a D/A converter 374 for converting image data into a signal for display on a liquid crystal monitor 372, frame memory 376 configured by VRAM, etc. for temporarily storing an image and information to be displayed, and an OSD 378 for converting code information from the CPU 304 into character and message data and displaying the data on the screen.

Figure 3:
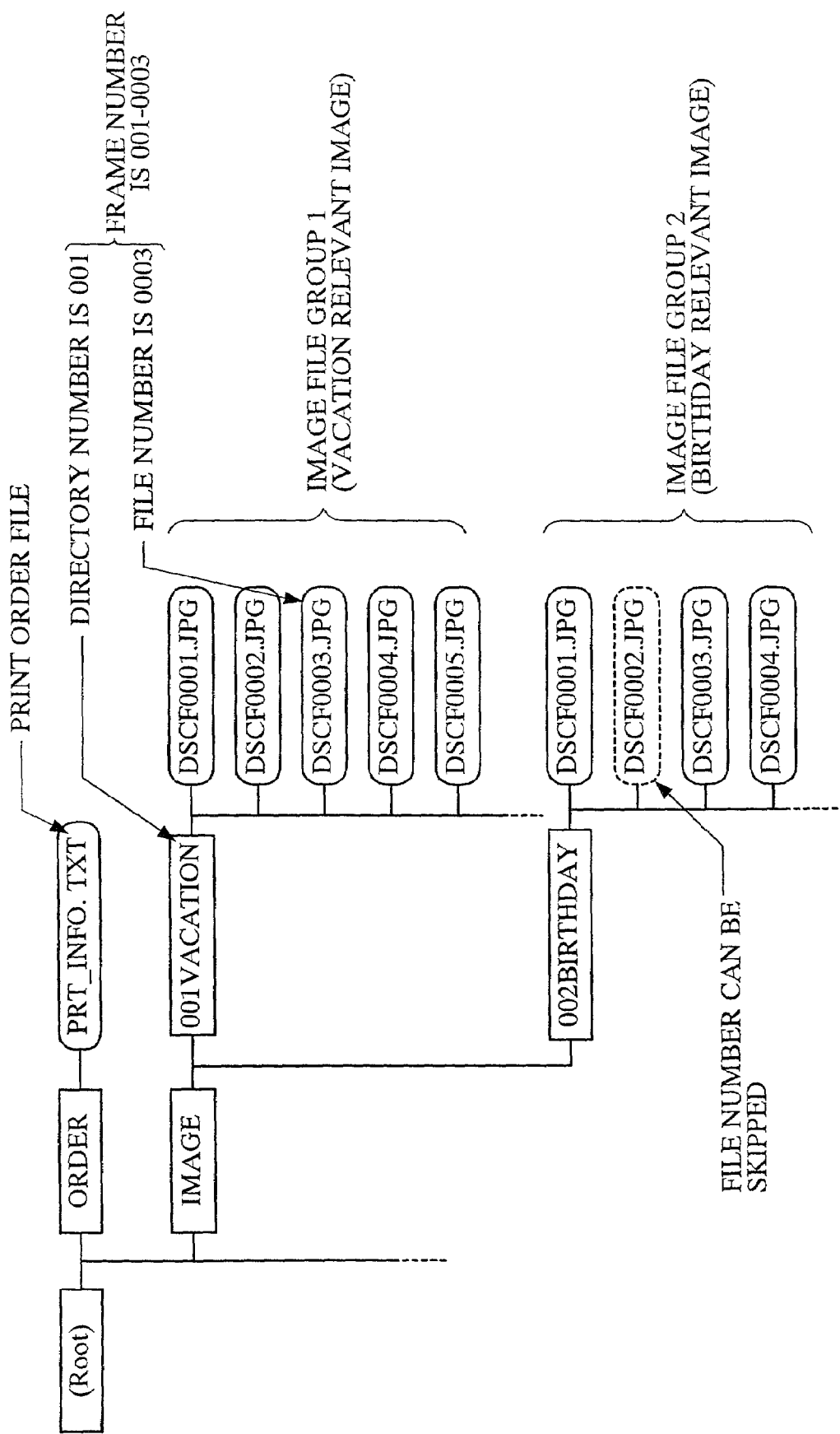
FIG. 3 shows an example of the structure of the records of an image file and a print order file stored in the memory card of a digital camera.

FIG. 3 shows an example of the structure of recording an image file and a print order file stored in the memory card 322. FIG. 4 shows the contents of the print order file. The installed terminal 10 automatically performs a printing process by checking the print order file.

Figure 5:
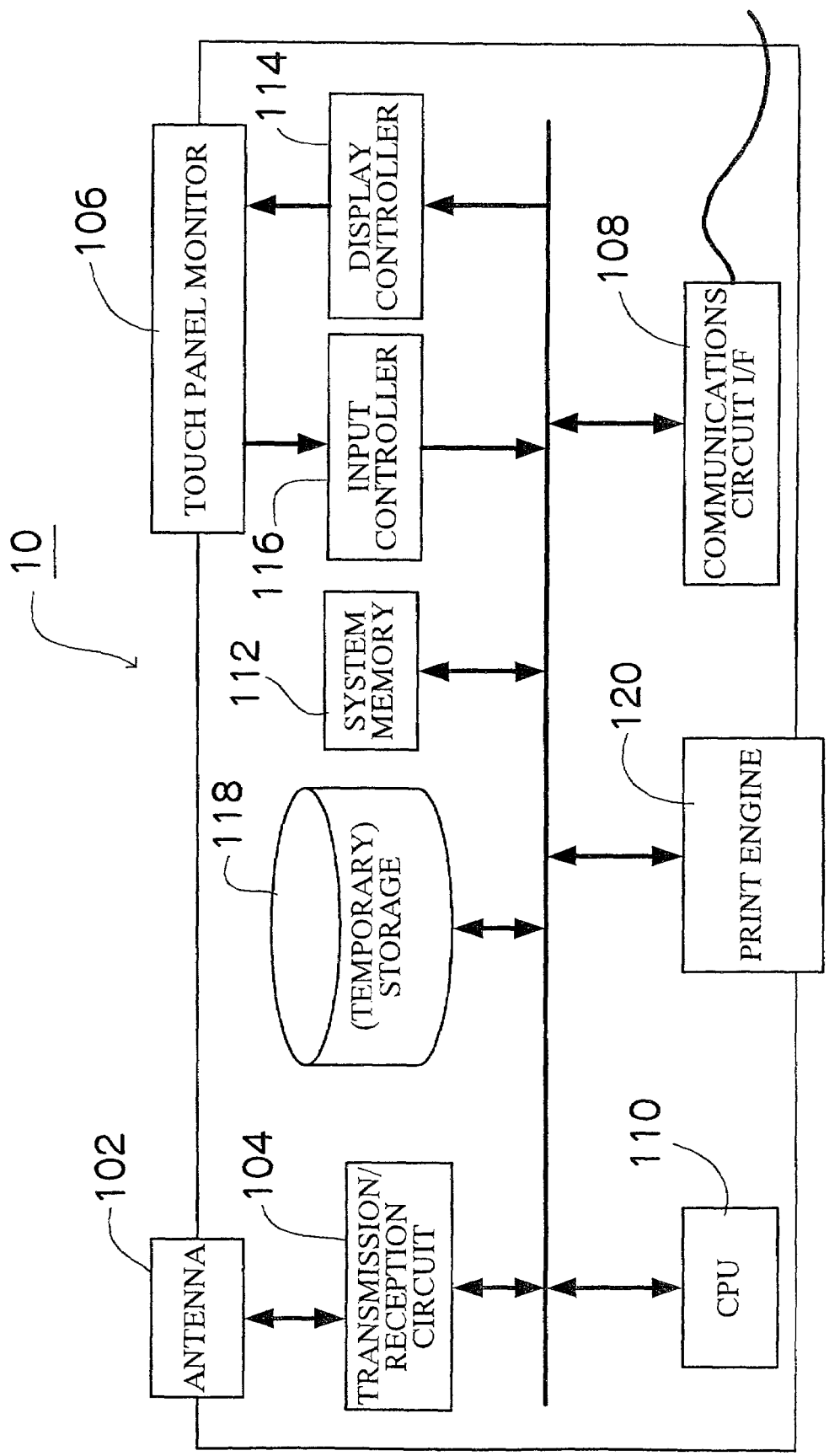
FIG. 5 is a block diagram of the internal configuration of the installed terminal shown in FIG. 1.

FIG. 5 is a block diagram of the internal configuration of the installed terminal 10. As shown in FIG. 5, the installed terminal 10 comprises an antenna 102 for a transmission/reception circuit 104 for radio-communicating with the digital camera 30 using Bluetooth, a touch panel 106 having the function of a display device for notifying a user of the communications situation, the information about the digital camera 30 connected through an image and communications, etc., and also having the function of an input device for a user inputting information, and a communications circuit I/F 108 that allows transmission to/reception from the installed terminal center 20, of required information.

Additionally, the installed terminal 10 further comprises a CPU 110 for generally controlling the installed terminal 10, system memory 112 comprising ROM to which a program for operating the CPU 110 and various constants, etc. are written and RAM which can be a work area when the CPU 110 performs a process, a display controller 114 for receiving the information to be displayed on the touch panel 106 from the CPU 110, converting the information into the display information and outputting it, and an input controller 116 for converting the information input by a user through the touch panel 106 and transmitting the converted information to the CPU 110.

The installed terminal 10 further comprises storage 118 for temporarily storing information such as an image, etc. received from the digital camera 30, print setting information, etc., and a print engine 120 for printing an image received from the digital camera 30.

As a device of the installed terminal 10 for fetching information from a user, a radio communications device can be replaced with a cable communications device, or a storage medium such as a floppy disk, a memory card, etc. storing the information about a user can be inserted into the installed terminal 10 to obtain the information through the storage medium.

Figure 6:
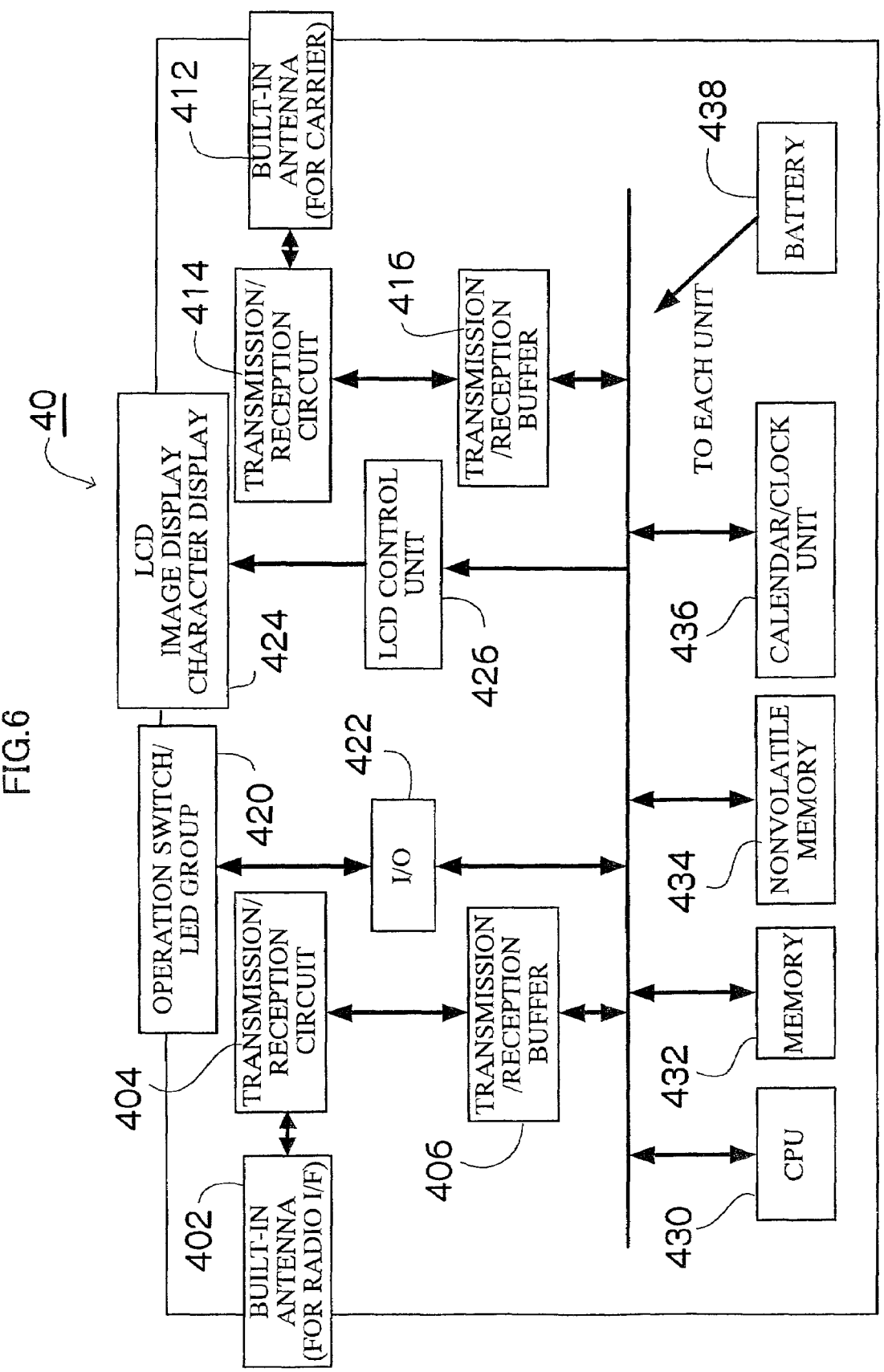
FIG. 6 is a block diagram of the internal configuration of the mobile phone shown in FIG. 1.

FIG. 6 is a block diagram of the internal configuration of the mobile phone 40. The function block as a mobile phone for common voice is omitted here.

As shown in FIG. 6, the mobile phone 40 comprises an antenna 402, a transmission/reception circuit 404, and a transmission/reception buffer 406 for establishing radio communications using Bluetooth, an antenna 412, a transmission reception circuit 414, and a transmission reception buffer 416 for a carrier for radio communications with the base station 50, an I/O port 422 connected to each operation switch 420, and an LCD control unit 426 for displaying a character, an image, etc. on a liquid crystal display (LCD) 424.

The mobile phone 40 further comprises a CPU 430 for generally controlling the mobile phone 40, memory 432 comprising ROM to which a program for operating the CPU 430, various constants, etc. are written, and RAM which can be a work area for use by the CPU 430 performing a process, nonvolatile memory 434 such as flash memory, EEPROM, etc., a calendar/clock unit 436, and a battery 438 for supplying power to each unit. The nonvolatile memory 434 can store identification data, etc. of the mobile phone 40 authenticated in the carrier center 60.

The operations of the system including the method of authenticating the mobile units according to the present invention are described below by referring to the flowchart shown in FIG. 7.

First, the user operates the digital camera 30, and establishes the communications between the digital camera 30 and the installed terminal 10. That is, the installed terminal 10 issues a unique PIN code (personal identification number), the user reads it, inputs the PIN code into the digital camera 30, compares the input PIN code with the PIN code received and issued by the installed terminal 10, specifies the digital camera of the user, and establishes the communications path.

Similarly, the digital camera 30 reserves the communications path of low-power radio communications for the mobile phone 40 of the digital camera 30 which have been paired with each other. Then, the digital camera 30 obtains an identification code of the mobile phone 40, and transmits the identification code to the installed terminal 10. The installed terminal 10 transmits the received identification code of the mobile phone 40 and the ID of the installed terminal 10 to the installed terminal center 20.

The installed terminal center 20 transmits the received identification code of the mobile phone 40 to the carrier center 60 to check the validity/invalidity of the mobile phone 40. The carrier center 60 determines the validity/invalidity of the mobile phone 40 (that is, whether or not the mobile phone 40 has been authenticated in the carrier center 60) according to the received identification code of the mobile phone 40. When the mobile phone 40 is determined to be valid, the carrier center 60 transmits the current position of the mobile phone 40 and the information indicating the largest possible amount billed to the installed terminal center 20. Since the information transmitted and received between the installed terminal center 20 and the carrier center 60 is personal information such as an identification code, etc., it is desired that the information is encrypted before transmission and reception. The carrier center 60 constantly confirms the location of each mobile phone through the base station 50, and the information about the current position of the mobile phone 40 transmitted from the carrier center 60 indicates the information about the base station communicable with the mobile phone 40 or the service area of the base station.

When the installed terminal center 20 confirms the validity of the mobile phone 40 according to the information received from the carrier center 60, it compares the current position of the mobile phone 40 with the installation position of the installed terminal 10. If the positions match each other, the installed terminal center 20 notifies the installed terminal 10 of the permission of the start of service and the largest possible amount billed. In the installed terminal center 20 the installation position of each installed terminal is entered based on the ID of each installed terminal, and the installed terminal center 20 determines that the positions match each other when the installation position read based on the ID of the installed terminal 10 is in the service area of the communicable base station for the mobile phone 40.

When the installed terminal 10 receives the notification of the permission of the start of service and the largest possible amount billed from the installed terminal center 20, it requests the digital camera 30 for print order information, obtains the print order information (information about a print order file, or the file itself) from the digital camera 30, and computes the print rate required for the printing process. Then, it confirms whether or not the print rate is equal to or smaller than the largest possible amount billed obtained from the installed terminal center 20, and performs the printing process on the following conditions. That is, the installed terminal 10 obtains an image file to be printed from the digital camera 30, and prints the image file. The printing process is repeated until all of the files specified by the print order information are completely printed.

When the printing process is completed, the installed terminal 10 notifies the installed terminal center 20 of the billed amount (print rates), the identification code of the mobile phone 40, and the ID of the installed terminal 10. The installed terminal center 20 charges the carrier center 60 for the billed amount. When the carrier center 60 completes the billing process, each communications path is disconnected. The connection between the digital camera 30 and the mobile phone 40, and the connection between the digital camera 30 and the installed terminal 10 are made using a connection type link. The connection between the installed terminal 10 and the installed terminal center 20, and the connection between the installed terminal center 20 and the carrier center 60 are constantly made.

Described below are other embodiments of the mobile unit authenticating method according to the present invention.

As described above, when the communications paths are reserved between the digital camera 30 and the installed terminal 10, and between the digital camera 30 and the mobile phone 40, the mobile phone 40 is notified of the ID of the installed terminal 10. The mobile phone 40 transmits the ID of the installed terminal 10 together with the identification data of the mobile phone 40 to the carrier center 60. The carrier center 60 notifies the installed terminal center 20 of the validity/invalidity of the mobile phone 40 and the information about the largest possible amount billed of the mobile phone 40 based on the identification data of the mobile phone 40, and also notifies the installed terminal center 20 of the ID of the installed terminal 10.

Upon receipt of the notification of the validity of the mobile phone 40, the installed terminal center 20 notifies the installed terminal 10 of the permission of the start of service and the largest possible amount billed based on the ID of the installed terminal 10 simultaneously received together with the notification of the validity. Afterwards, the processes are performed as described above.

According to the present embodiment, an installed terminal center for integrally managing a plurality of installed terminals is provided so that the notification of permission/rejection of service to an installed terminal can be issued from the installed terminal center. However, each installed terminal can have the function of the above-mentioned installed terminal center to omit the installed terminal center.

Furthermore, the mobile unit of a user is not limited to a digital camera. That is, an MP3 unit, a PDA, etc. can be used. In addition, the service in an installed terminal is not limited to a print service, but other service such as music downloading service can be provided. Additionally, a mobile phone is used as a mobile unit already authenticated in another system. However, the mobile unit is not limited to the application, but a credit card, a prepaid card, etc. having a communications function can also be used.

As described above, according to the present invention, a second mobile unit such as a mobile phone already authenticated can be used before obtaining service from an installed terminal, and a first mobile unit can be authenticated (subauthenticated) only by an operation of the first mobile unit such as an unauthenticated digital camera, etc., thereby permitting service in an installed terminal connected to the first mobile unit. In addition, by comparing the current position of the second mobile unit with the installation position of the installed terminal, the possibility of illegally using the second mobile unit can be reduced. Furthermore, by using the billing system of the second mobile unit, cashless service of an installed terminal can be obtained, and service can be allowed when a service rate is equal to or smaller than the largest possible amount billed, thereby correctly billing for service.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A mobile unit authenticating method which authenticates a first mobile unit of a user when service is offered through communications of digital content between an installed terminal and the first mobile unit, comprising the steps of:

connecting the first mobile unit of the user to the installed terminal;

connecting the first mobile unit to a second mobile unit of the user which has been authenticated by another system;

transmitting identification information about the second mobile unit to the installed terminal through the first mobile unit;

transmitting the identification information about the second mobile unit from the installed terminal or an installed terminal center which integrally manages a plurality of installed terminals including the installed terminal to a management center which manages the identification information about the second mobile unit when the installed terminal receives the identification information about the second mobile unit;

determining whether or not the second mobile unit is valid based on the received identification information about the second mobile unit when the management center receives the identification information about the second mobile unit;

transmitting a determination result to the installed terminal or the installed terminal center;

setting service between the installed terminal and the first mobile unit as allowed in the installed terminal if it is determined that the second mobile unit is valid; and if service is set as allowed, processing, in the installed terminal, digital content provided by the first mobile unit in accordance with a requested service.

2. The mobile unit authenticating method according to claim 1, wherein determining whether or not the second mobile unit is valid comprises:
 transmitting, from the management center, information about a current position of the second mobile unit to the installed terminal or the installed terminal center; comparing, at the installed terminal or the installed terminal center, a position of the installed terminal with the current position of the second mobile unit; and
 allowing or rejecting service between the installed terminal and the first mobile unit based on a result of the comparison.

3. The mobile unit authenticating method according to claim 1, further comprising:
 transmitting, to the installed terminal or the installed terminal center, information about a largest possible amount to be billed to the second mobile unit;
 calculating a charge to carry out a requested service; and
 rejecting service between the installed terminal and the first mobile unit if an amount of the calculated charge for the requested service in the installed terminal is greater than the largest possible amount to be billed.

4. The mobile unit authenticating method according to claim 1, wherein the installed terminal or the installed terminal center transmits charges to the management center for processing the digital content in the installed terminal, and the management center includes the charges in a billed amount of the user of the second mobile unit.

5. A mobile unit authenticating method which authenticates a first mobile unit of a user when service is offered through communications of digital content between an installed terminal and the first mobile unit, comprising the steps of:
 connecting the first mobile unit of the user to the installed terminal;
 connecting the first mobile unit to a second mobile unit of the user which has been authenticated by another system;
 obtaining identification information about the installed terminal;
 transmitting the identification information about the installed terminal and identification information about the second mobile unit to a management center for managing the identification information about the second mobile unit;
 determining whether or not the second mobile unit is valid based on the received identification information about the second mobile unit when the management center receives the identification information about the second mobile unit;
 transmitting a determination result to the installed terminal or an installed terminal center for integrally managing a plurality of installed terminals including the installed terminal; setting service between the installed terminal and the first mobile unit as allowed in the installed terminal based on the determination result; and
 if service is set as allowed, processing, in the installed terminal, digital content provided by the first mobile unit in accordance with a requested service.

6. The mobile unit authenticating method according to claim 5, wherein determining whether or not the second mobile unit is valid comprises:
 transmitting from the management center information about a current position of the second mobile unit to the installed terminal or the installed terminal center;
 comparing a position of the installed terminal with the current position of the second mobile unit; and
 allowing or rejecting service between the installed terminal and the first mobile unit based on a result of the comparison.

7. The mobile unit authenticating method according to claim 5, further comprising:
 transmitting, to the installed terminal or the installed terminal center, information about a largest possible amount to be billed to the second mobile unit;
 calculating a charge to carry out a requested service; and
 rejecting service between the installed terminal and the first mobile unit if an amount of the calculated charge for the requested service is greater than the largest possible amount to be billed.

8. The mobile unit authenticating method according to claim 5, wherein the installed terminal or the installed terminal center transmits charges to the management center for processing the digital content in the installed terminal, and the management center includes the charges in a billed amount of the user of the second mobile unit.

9. A mobile unit authenticating method which authenticates a first mobile unit of a user when service is offered through communications of digital content between an installed terminal and the first mobile unit, comprising the steps of:
 connecting the first mobile unit of the user to the installed terminal;
 connecting the first mobile unit to a second mobile unit of the user which has been authenticated by another system;
 transmitting identification information about the second mobile unit to the installed terminal through the first mobile unit;
 transmitting the identification information about the second mobile unit from the installed terminal or an installed terminal center which integrally manages a plurality of installed terminals including the installed terminal to a management center which manages the identification information about the second mobile unit when the installed terminal receives the identification information about the second mobile unit;
 determining whether or not the second mobile unit is valid based on the received identification information about the second mobile unit when the management center receives the identification information about the second mobile unit;
 transmitting a determination result to the installed terminal or the installed terminal center;
 setting service between the installed terminal and the first mobile unit as allowed in the installed terminal if it is determined that the second mobile unit is valid;
 the installed terminal obtaining image files to be printed from the first mobile unit if service is set as allowed; and
 printing the image files to be printed in the installed terminal.

10. The mobile unit authenticating method according to claim 9, wherein determining whether or not the second mobile unit is valid comprises:
 transmitting, from the management center, information about a current position of the second mobile unit to the installed terminal or the installed terminal center;
 comparing, at the installed terminal or the installed terminal center, a position of the installed terminal with the current position of the second mobile unit; and
 allowing or rejecting service between the installed terminal and the first mobile unit based on a result of the comparison.

11. The mobile unit authenticating method according to claim 9, further comprising:
- transmitting, to the installed terminal or the installed terminal center, information about a largest possible amount to be billed to the second mobile unit; and rejecting service between the installed terminal and the first mobile unit when an amount billed to the user for service in the installed terminal is greater than the largest possible amount to be billed.

12. The mobile unit authenticating method according to claim 9, wherein the installed terminal or the installed terminal center transmits charges to the management center for service rates on offered service in the installed terminal, and the management center includes the service rates in a billed amount of the user of the second mobile unit.

13. A mobile unit authenticating method which authenticates a first mobile unit of a user when service is offered through communications of digital content between an installed terminal and the first mobile unit, comprising the steps of:
- connecting the first mobile unit of the user to the installed terminal;
- connecting the first mobile unit to a second mobile unit of the user which has been authenticated by another system;
- obtaining identification information about the installed terminal;
- transmitting the identification information about the installed terminal and identification information about the second mobile unit to a management center for managing the identification information about the second mobile unit;
- determining whether or not the second mobile unit is valid based on the received identification information about the second mobile unit when the management center receives the identification information about the second mobile unit;
- transmitting a determination result to the installed terminal or an installed terminal center for integrally managing a plurality of installed terminals including the installed terminal;
- setting service between the installed terminal and the first mobile unit as allowed in the installed terminal based on the determination result;
- the installed terminal obtaining image files to be printed from the first mobile unit if service is set as allowed; and
- printing the image files to be printed in the installed terminal.

14. The mobile unit authenticating method according to claim 13, wherein determining whether or not the second mobile unit is valid comprises:
- transmitting from the management center information about a current position of the second mobile unit to the installed terminal or the installed terminal center;
- comparing a position of the installed terminal with the current position of the second mobile unit; and
- allowing or rejecting service between the installed terminal and the first mobile unit based on a result of the comparison.

15. The mobile unit authenticating method according to claim 13, further comprising:
- transmitting, to the installed terminal or the installed terminal center, information about a largest possible amount to be billed to the second mobile unit; and
- rejecting service between the installed terminal and the first mobile unit when a billed amount of the user for the service in the installed terminal is greater than the largest possible amount to be billed.

16. The mobile unit authenticating method according to claim 13, wherein the installed terminal or the installed terminal center transmits charges to the management center for service rates on offered service in the installed terminal, and the management center includes the service rates in a billed amount of the user of the second mobile unit.

* * * * *